(12) United States Patent
Zhang

(10) Patent No.: US 7,089,360 B1
(45) Date of Patent: Aug. 8, 2006

(54) SHARED CACHE WORDLINE DECODER FOR REDUNDANT AND REGULAR ADDRESSES

(75) Inventor: Kevin X. Zhang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/532,411

(22) Filed: Mar. 22, 2000

(51) Int. Cl.
G06F 12/08 (2006.01)

(52) U.S. Cl. .................................. 711/118; 708/708
(58) Field of Classification Search ............... 365/4, 365/18, 105, 230.06, 200; 712/2, 3, 7, 213; 708/708
See application file for complete search history.

(56) References Cited

U.S. PATENT DOCUMENTS

| | | |
|---|---|---|
| 4,804,871 A | 2/1989 | Walters, Jr. |
| 4,905,189 A | 2/1990 | Brunolli |
| 4,926,385 A | 5/1990 | Fujishimia et al. |
| 5,179,536 A | 1/1993 | Kasa et al. |
| 5,227,997 A | 7/1993 | Kikuda et al. |
| 5,253,203 A | 10/1993 | Partovi et al. |
| 5,257,236 A | 10/1993 | Sharp |
| 5,315,558 A | 5/1994 | Hag |
| 5,353,424 A | 10/1994 | Partovi et al. |
| 5,488,583 A | 1/1996 | Ong et al. |
| 5,523,974 A | 6/1996 | Hirano et al. |
| 5,532,947 A | 7/1996 | Potter et al. |
| 5,542,062 A | 7/1996 | Taylor et al. |
| 5,555,529 A | 9/1996 | Hose, Jr. et al. |
| 5,568,442 A | 10/1996 | Kowalczyk et al. |
| 5,583,806 A | 12/1996 | Widigen et al. |
| 5,640,339 A | 6/1997 | Davis et al. |
| 5,657,281 A | 8/1997 | Rao |
| 5,657,469 A | 8/1997 | Shimizu |
| 5,680,569 A | 10/1997 | Correll |
| 5,710,731 A | 1/1998 | Ciraula et al. |
| 5,754,819 A * | 5/1998 | Lynch et al. ................. 711/218 |
| 5,822,257 A | 10/1998 | Ogawa |
| 5,835,928 A * | 11/1998 | Auslander et al. ............. 711/3 |
| 5,841,687 A | 11/1998 | Rees |
| 5,854,761 A | 12/1998 | Patel et al. |
| 5,860,092 A | 1/1999 | Breid et al. |
| 5,875,121 A * | 2/1999 | Yetter .......................... 708/200 |
| 5,890,201 A | 3/1999 | McLellan et al. |

(Continued)

FOREIGN PATENT DOCUMENTS

WO    WO 99/64953    12/1999

(Continued)

OTHER PUBLICATIONS

Cortadella, et al., "Evaluation of A+B=K Conditions Without Carry Proagation," IEEE Transactions On Computers, vol. 41, pp. 1484-1488, No. 11, Nov. 1992.

(Continued)

*Primary Examiner*—Donald Sparks
*Assistant Examiner*—Jared Rutz
(74) *Attorney, Agent, or Firm*—Larry M. Mennemeier

(57) ABSTRACT

In one embodiment, a wordline decoder provides access to cache memory locations when addresses are bypassed directly from arithmetic circuitry in redundant form. The wordline decoder is also designed to provide access to cache memory locations when addresses are received from registers in an unsigned binary form. The combined functionality is provided in a pre-decode circuit by selectively replacing one of a plurality of redundant bit vectors with a constant bit vector when redundant addressing is not enabled.

33 Claims, 17 Drawing Sheets

U.S. PATENT DOCUMENTS

| | | | |
|---|---|---|---|
| 5,920,515 A | 7/1999 | Shaik et al. | |
| 5,933,376 A | 8/1999 | Lee | |
| 5,956,274 A | 9/1999 | Elliott et al. | |
| 5,970,912 A | 10/1999 | Supple et al. | |
| 5,999,457 A * | 12/1999 | Sato | 365/189.01 |
| 6,034,902 A * | 3/2000 | Zettler et al. | 365/195 |
| 6,098,150 A | 8/2000 | Brethour et al. | |
| 6,166,973 A | 12/2000 | Shinozaki | |
| 6,172,933 B1 | 1/2001 | Sager | |
| 6,181,612 B1 | 1/2001 | Wada | |
| 6,209,076 B1 | 3/2001 | Blomgren | |
| 6,212,109 B1 | 4/2001 | Proebsting | |
| 6,256,238 B1 | 7/2001 | Nagasawa et al. | |
| 6,256,709 B1 | 7/2001 | Patel | |
| 6,282,141 B1 * | 8/2001 | Muranaka et al. | 365/230.03 |
| 6,341,327 B1 | 1/2002 | Sager | |
| 6,356,485 B1 | 3/2002 | Proebsting | |
| 6,363,020 B1 | 3/2002 | Shubat et al. | |
| 6,373,753 B1 | 4/2002 | Proebsting | |
| 6,373,758 B1 | 4/2002 | Hughes et al. | |

FOREIGN PATENT DOCUMENTS

| | | |
|---|---|---|
| WO | PCT/US 02/18181 | 10/2002 |

OTHER PUBLICATIONS

Heald, et al., "Sum-Addressed-Memory Cache with 1.6ns Cycle and 2.6ns Latency", IEEE ISSCC, Paper SP 22.2, Feb. 7, 1998, 2 pages.

Cortadella, et al., "Evaluation of A+B=K Conditions In Constant Time," IEEE ISCAS'88 Proceedings, vol. 1, CH2458-8, Jun. 7-9, 1988.

Lutz, et al., "The Half-Adder form and Early Branch Condition Resolution," IEEE ARITH'97, pp. 266-273.

Lutz, et al., "Early Zero Detection", IEEE ICCD'96, pp. 545-550.

* cited by examiner

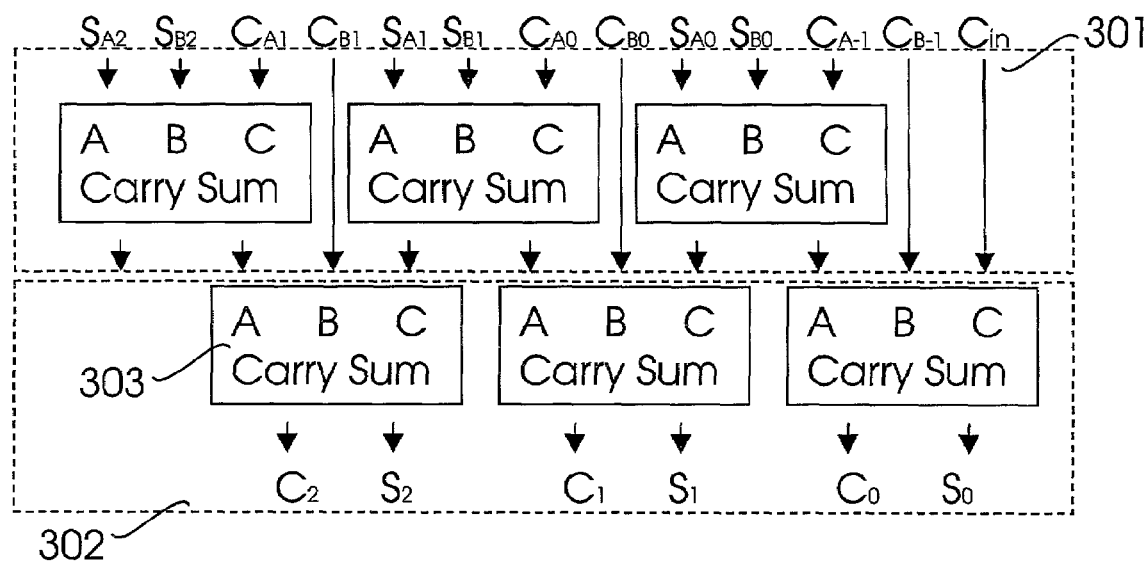

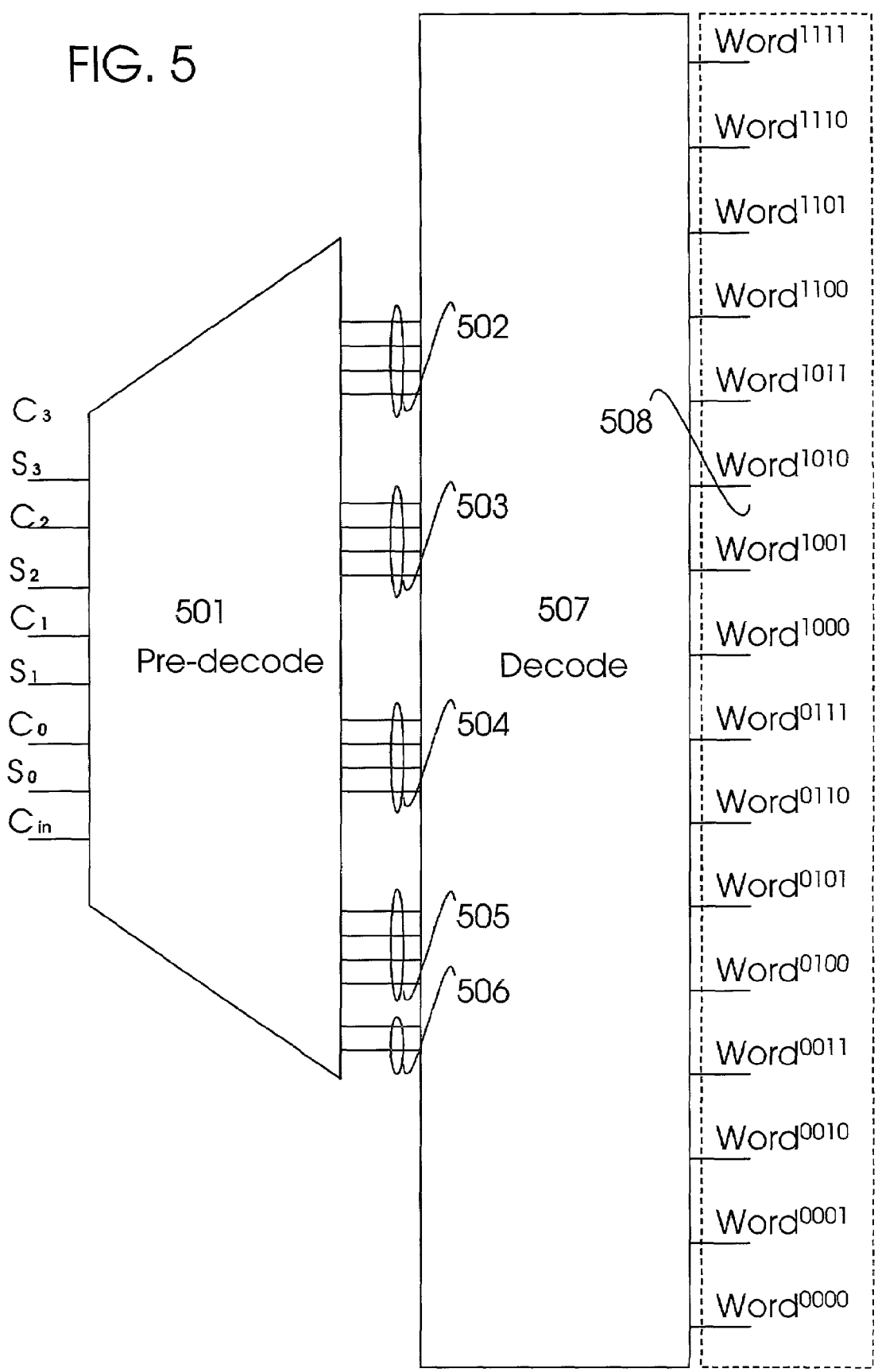

SHARED CACHE WORDLINE DECODER FOR REDUNDANT AND REGULAR ADDRESSES

FIELD OF THE INVENTION

This invention relates generally to decoders for memory, and in particular to decoders for high-speed cache memory.

BACKGROUND OF THE INVENTION

A cache is a fast memory for storing copies of frequently accessed data. As processors become faster, cache access time is often a dominating factor in system performance. Conflicting goals face designers of cache memory systems. Smaller caches provide faster access times, but larger caches provide higher hit ratios, thereby reducing penalties associated with accessing slower memory.

Since a current trend in processor design is to devote a substantial proportion of chip area to cache memory, much effort has been invested in improving access times for large caches.

One prior art method shown in, for example, U.S. Pat. No. 5,532,947 combines an adder for generating an effective address with a word-line decoder. This combined decoder/adder is shown in FIG. 1. Another prior art method shown in, for example, U.S. Pat. No. 5,860,092 combines an adder with a pre-decoder circuit to provide an input to a word-line driver. FIG. 2 shows this prior art method. One disadvantage with these two methods is that carry propagation for larger addresses can adversely affect cache access time.

In another prior art method, Cortadella et al (in "Evaluation of A+B=K Conditions Without Carry Propagation," IEEE Transactions on Computers, vol. 41, pp. 1484–1488, November, 1992) show that an equality test does not require carry propagation. One representation of a sum A+B, which is suitable for use in a carry nonpropagative equality test, is known as half-adder or carry-sum form. The carry-sum representation uses a carry bit, $C_i$, and a sum bit, $S_i$, to represent a binary digit of a number in the ith digit position. In carry-sum form each number may have multiple valid representations. In a system of numbers, where each number is assigned multiple binary representations, the numbers are said to be in redundant form.

Current processors make use of pipelining to reduce cycle times and exploit parallelism within instruction streams. In order to make pipelining efficient, results from digital arithmetic circuitry are bypassed back to circuit inputs as operands for the next operation in a pipeline. This technique is preferred over one of waiting until results are written back to a register file, and it provides for higher utilization of a pipeline's parallelism. Since quickly loading operands from memory is critical to the performance of a processor, it may be desirable to bypass results of address computations to a load/store unit in order to reduce any delays associated with the load.

When bypassed addresses are used to access cache it is desirable to have a cache that can decode addresses in redundant form. When address calculations have time to complete, the addresses are already converted to a unsigned binary number and so a traditional decoder is desirable. Often, a design decision must be made to store all addresses to one or the other form because two decoders require too much in area resorces.

BRIEF DESCRIPTION OF THE DRAWINGS

The present invention is illustrated by way of example and not limitation in the figures of the accompanying drawings.

FIG. 3 shows a carry-save adder circuit.

FIG. 4a shows a ROM implementation of a 3:2 compressor or counter based on the truth table for addition in a carry-sum redundant form.

FIG. 5 shows a cache wordline decoder for decoding addresses in a carry-sum redundant form.

DETAILED DESCRIPTION

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

In one embodiment, a cache wordline decoder, herein described, provides pre-decode circuitry to identify subsequences from redundant addresses and can be configured to also identify subsequences from unsigned binary addresses for decoding into identified wordline sequences. The wordline sequences are used to access data stored in cache memory at corresponding storage locations. Since data in memory requested by a load operation is desired more urgently than result data needs to be written back into memory, a disclosed embodiment of a cache wordline decoder provides a way to process load requests without waiting for load address calculations to be completed. But since store address calculations typically have time to finish, this embodiment of a cache wordline decoder provides a way to process store requests without requiring a second wordline decoder for unsigned binary addresses.

One method for quickly calculating load addresses is to use a carry nonpropagative arithmetic circuit such as a carry-save adder to sum addressing components, possibly including a base address and an index or a displacement. Results from a carry-save adder can be bypassed to a load-store unit in redundant form, without waiting for carry propagation to complete.

Figure 1:
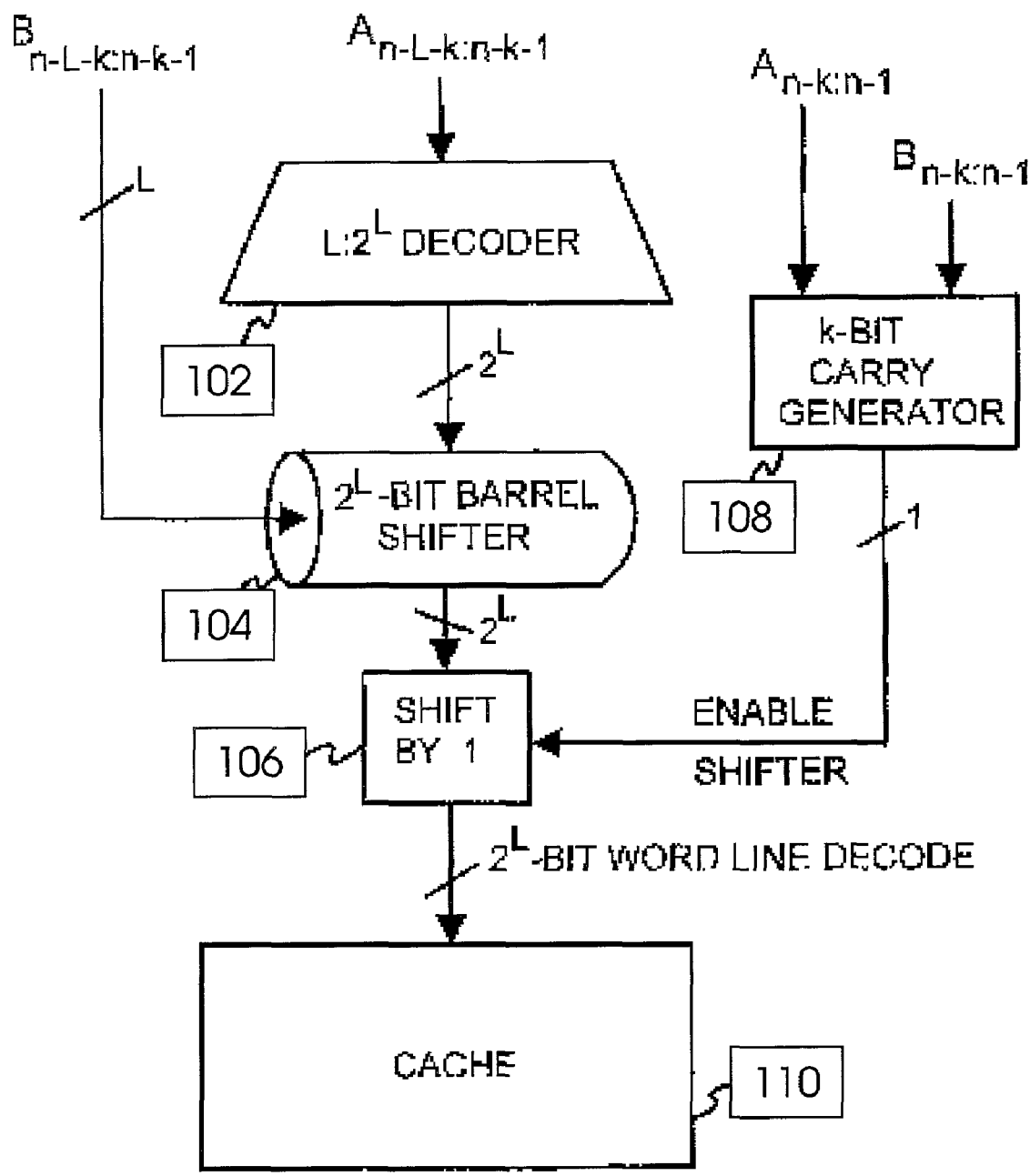
FIG. 1 shows a prior art adder/decoder.
Figure 2:
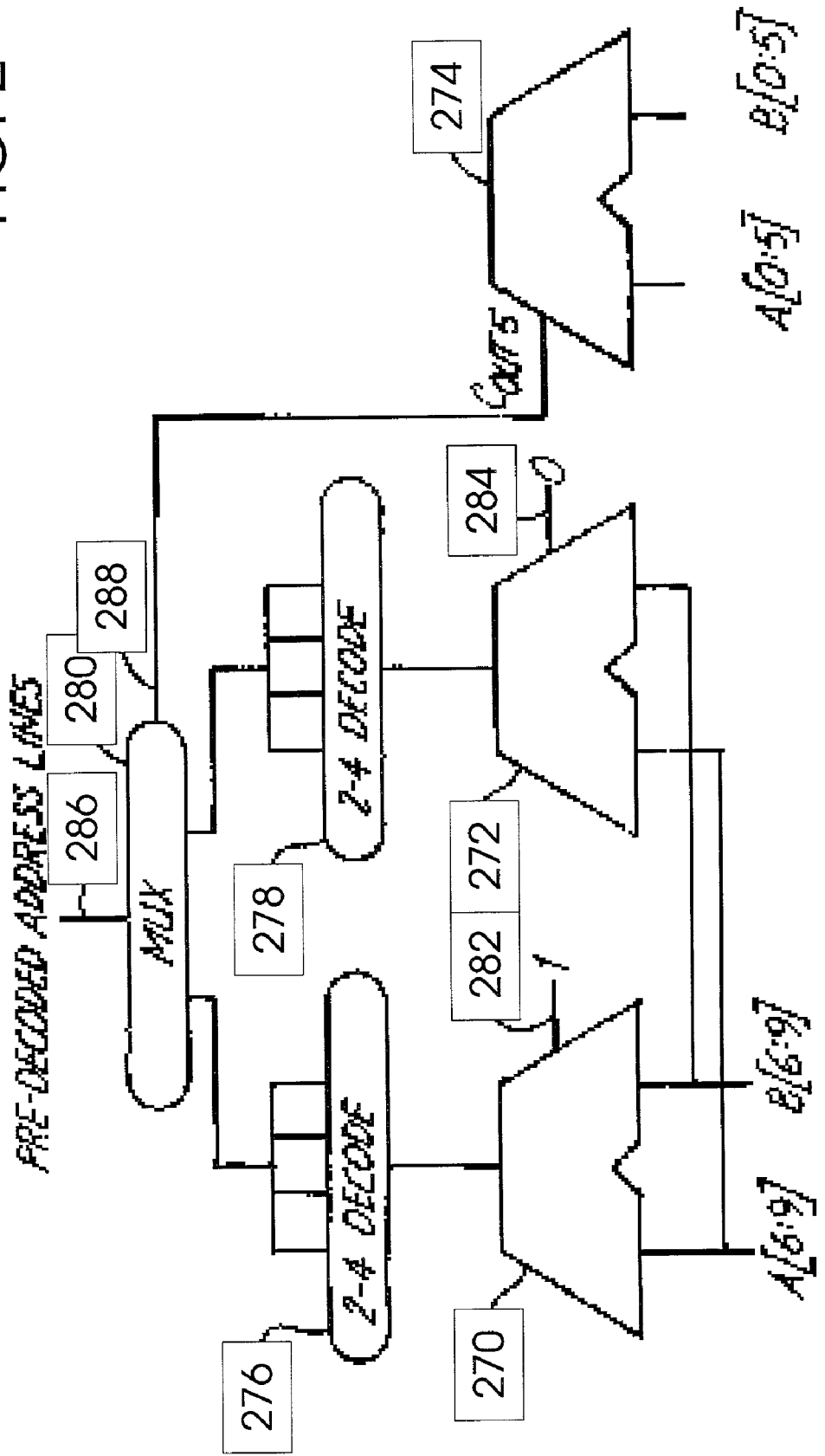
FIG. 2 shows another prior art adder/decoder.
Figure 4B:
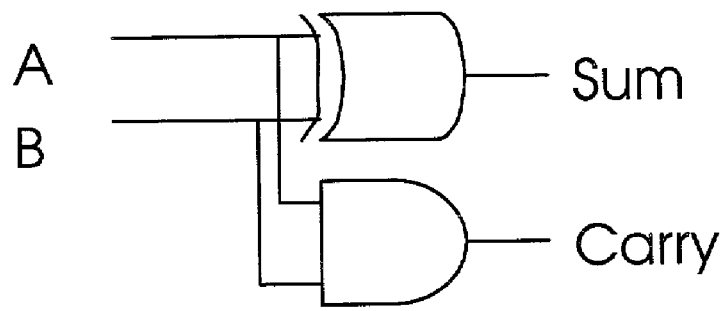
FIG. 4b shows a half adder circuit, which can be used as a building block to construct a full adder circuit.
Figure 4C:
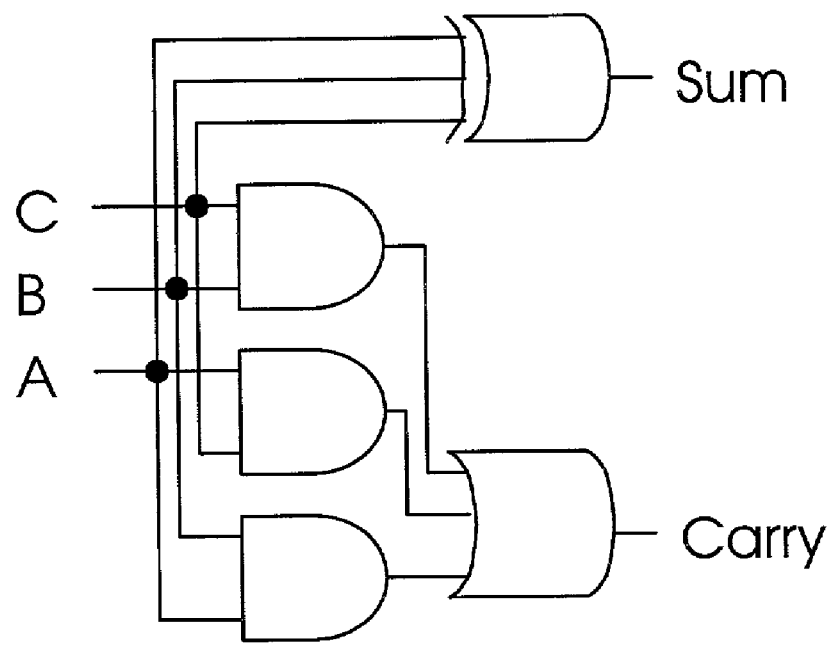
FIG. 4c shows a 3:2 compressor or counter that can be used to form the basic building block of a carry-save adder.

A carry save adder is shown in FIG. 3. The carry save adder has a structure very similar to that of a traditional adder except for eliminating the need to propagate carry signals generated in a first stage, 301, along the length of the result in a second stage, 302. When adding two of these numbers together, circuits, 303, which are similar to traditional half adders and 3:2 compressors can be used. FIG. 4a shows a truth table for the 3:2 compressor, which could be implemented in a read-only memory (ROM). FIG. 4b shows the traditional half adder circuit, and FIG. 4c shows a 3:2 compressor circuit that can be used to form the basic building block, 303, of a carry save adder.

In order to access cache using such an address, a cache wordline decoder for decoding addresses in a carry-sum redundant form is required. The type of cache wordline decoder required is depicted in FIG. 5. It accepts addresses in which the binary digits comprise carry bits, $C_i$, and sum bits, $S_i$, produced by a carry-save adder. In order to identify a corresponding wordline, $Wordline^i$, in cache memory, adjacent digits can first be pre-decoded by pre-decoder 501 to identify possible subsequences that could result from completion of carry propagation. According to the identified possible subsequences, subsequence indicators in subsequence indicator sets 502, 503, 504, and 505, 506 are activated. These subsequence indicators are combined in decoder 507 to identify a unique wordline sequence. According to the wordline sequence identified, one of a set of wordline indicators 508 is activated to access a corresponding location in cache.

Figure 6:
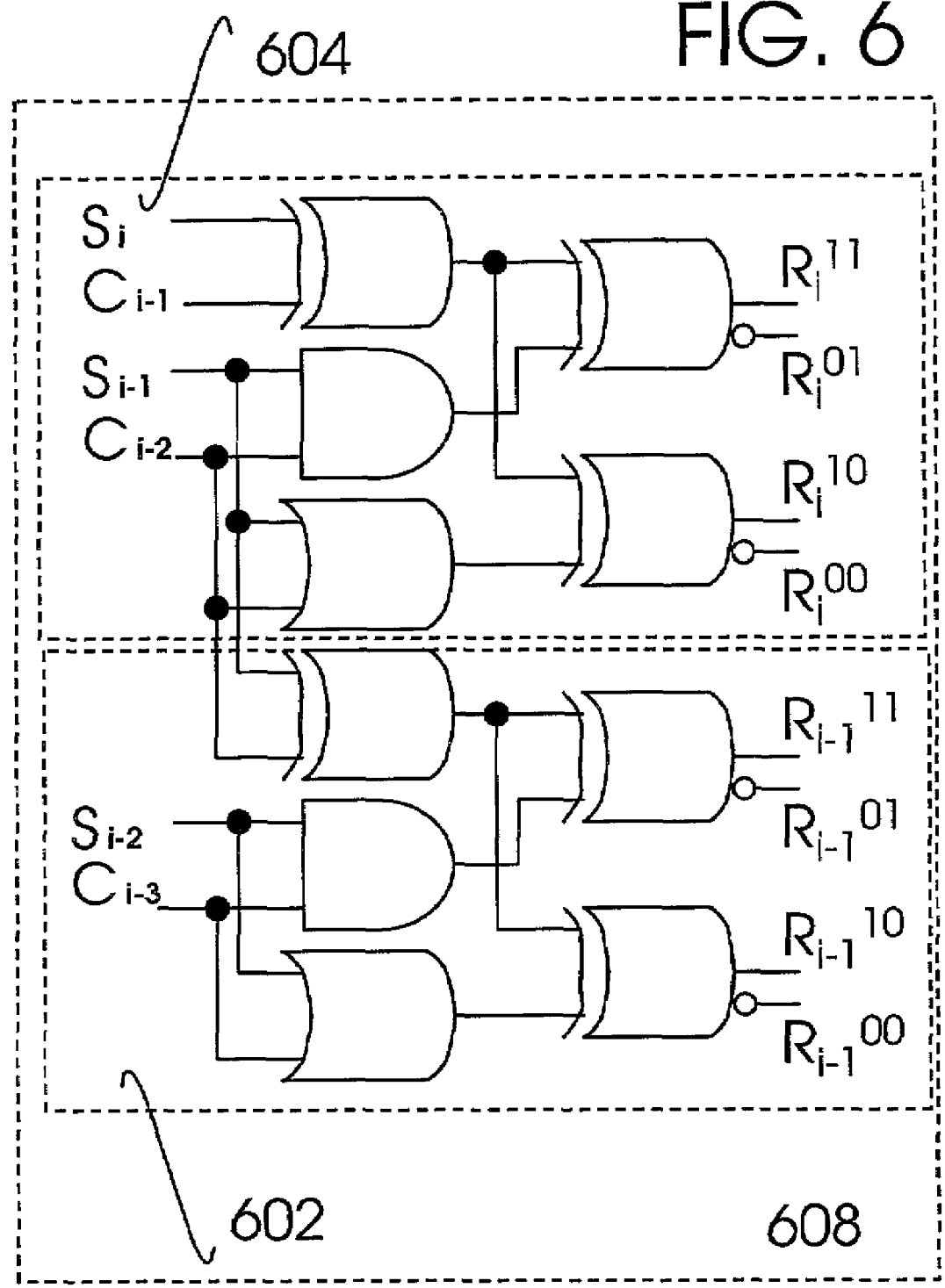
FIG. 6 shows one embodiment of a pre-decoder component circuit that accepts addresses in a carry-sum redundant form.

Identification of possible subsequences from carry-sum redundant digits can be accomplished using a circuit like the one shown in FIG. 6. This embodiment of a pre-decoder component circuit 608 comprises pre-decoder component circuit 604 and pre-decoder component circuit 602. Pre-decoder component circuit 604 accepts, sum bits, $S_i$ and $S_{i-1}$, and carry bits, $C_{i-1}$, and $C_{i-2}$, of an address in carry-sum redundant form and identifies possible two-bit subsequences that could result at positions, i and i–1 when the carry-sum address is converted into two's complement form. The identified possible subsequences are indicated by activating at least one of the four possible subsequence indicator signals, $R_i^{11}$, $R_i^{01}$, $R_i^{10}$ and $R_i^{00}$. Likewise, sum bits, $S_{i-1}$ and $S_{i-2}$, and carry bits, $C_{i-2}$ and $C_{i-3}$, can be used by pre-decoder component circuit 602 to identify possible two-bit subsequences that could result at positions, i–1 and i–2 when the address is converted to two's complement. The possible subsequences are indicated by activating at least one of the four possible subsequence indicator signals, $R_{i-1}^{11}$, $R_{i-1}^{01}$, $R_{i-1}^{10}$, $R_{i-1}^{00}$.

As shown in FIG. 6, the afore mentioned possible subsequence indicator signals (as shown in pre-decoder component circuit 604) for a subsequence with most significant bit at position, i, in a wordline sequence are activated according to the following logic equations or their equivalents:

$R_i^{11} = (S_{i-1} \text{ AND } C_{i-2}) \text{ XOR}(S_i \text{XOR } C_{i-1})$, $R_i^{01} = (S_{i-1} \text{ AND } C_{i-2}) \text{ XNOR}(S_i \text{XOR } C_{i-1})$, $R_i^{10} = (S_{i-1} \text{ OR } C_{i-2}) \text{ XOR}(S_i \text{XOR } C_{i-1})$, $R_i^{00} = (S_{i-1} \text{ OR } C_{i-2}) \text{ XNOR}(S_i \text{XOR } C_{i-1})$.

Figure 7:
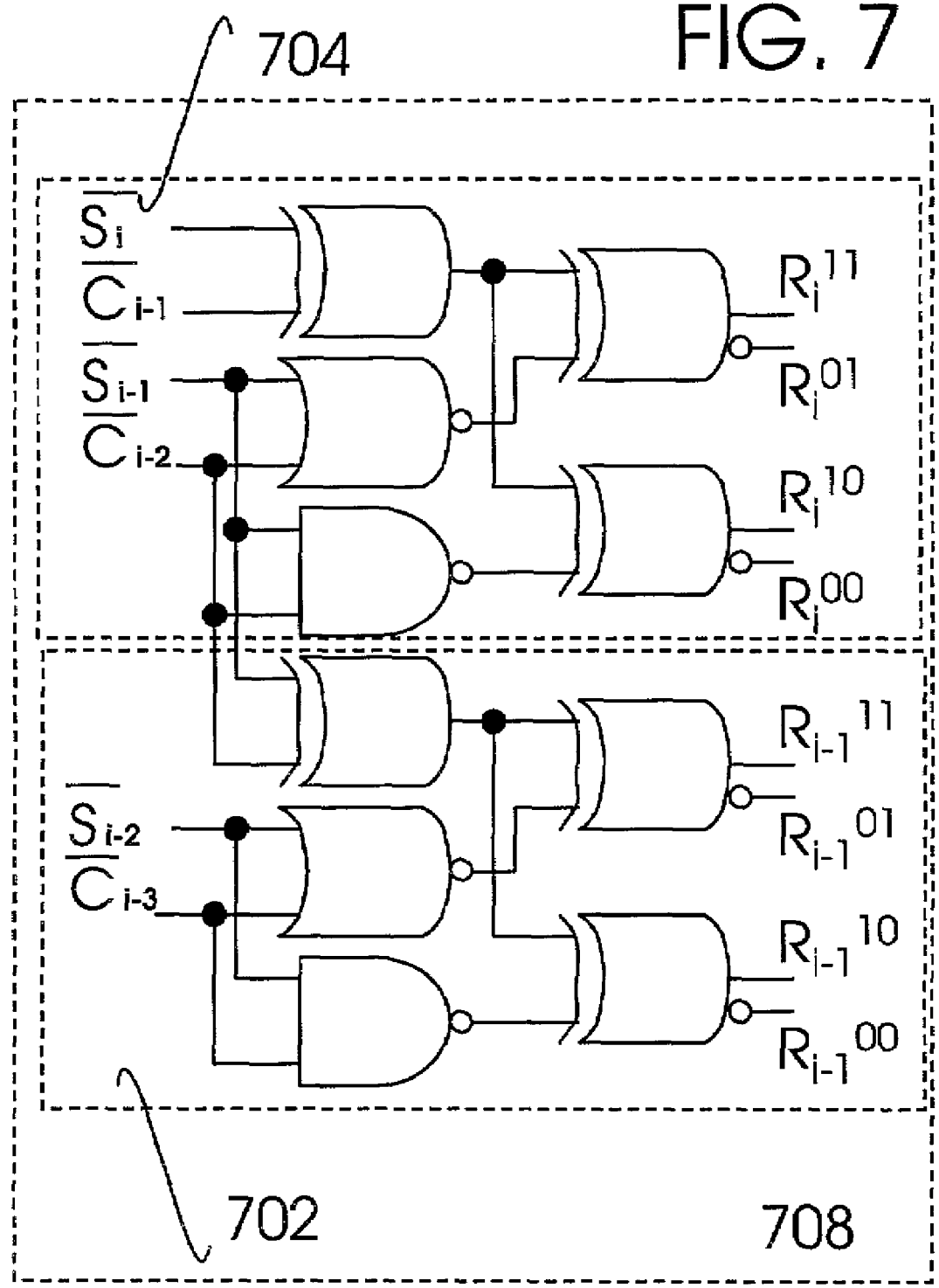
FIG. 7 shows another embodiment of a pre-decoder component circuit that accepts addresses in a negated carry-sum redundant form.

Another embodiment of a circuit for identification of possible subsequences from negated carry-sum redundant digits is shown in FIG. 7. This embodiment of a pre-decoder component circuit 708 comprises pre-decoder component circuit 704 and pre-decoder component circuit 702. Pre-decoder component circuit 704 accepts, negated sum bits, not $S_i$ and not $S_{i-1}$, and negated carry bits, not $C_{i-1}$ and not $C_{i-2}$, of an address in carry-sum redundant form and identifies possible two-bit subsequences that could result at positions, i and i–1 when the carry-sum address is converted into unsigned binary form. The identified possible subsequences are indicated by activating at least one of the four signals, $R_i^{11}$, $R_i^{01}$, $R_i^{10}$ and $R_i^{00}$. Likewise, negated sum bits, not $S_{i-1}$ and not $S_{i-2}$, and negated carry bits, not $C_{i-2}$ and not $C_{i-3}$, can be used by pre-decoder component circuit 702 to identify possible two-bit subsequences that could result at positions, i–1 and i–2 when the address is converted to unsigned binary. The possible subsequences are indicated by activating at least one of the four signals, $R_{i-1}^{11}$, $R_{i-1}^{01}$, $R_{i-1}^{10}$, $R_{i-1}^{00}$.

As shown in FIG. 7, the afore mentioned possible subsequence indicator signals (as shown in pre-decoder component circuit 704) for a subsequence with most significant bit at position, i, in a wordline sequence are activated according to the following logic equations or their equivalents:

$R_i^{11} = (\text{NOT } S_{i-1} \text{ NOR NOT } C_{i-2}) \text{ XOR}(\text{NOT } S_i \text{ XOR NOT } C_{i-1})$, $R_i^{01} = (\text{NOT } S_{i-1} \text{ NOR NOT } C_{i-2}) \text{ XNOR}(\text{NOT } S_i \text{ XOR NOT } C_{i-1})$, $R_i^{10}$=(NOT $S_{i-1}$ NAND NOT $C_{i-2}$) XOR(NOT $S_i$ XOR NOT $C_{i-1}$), $R_i^{00}$=(NOT $S_{i-1}$ NAND NOT $C_{i-2}$) XNOR(NOT $S_i$ XOR NOT $C_{i-1}$).

Figure 8:
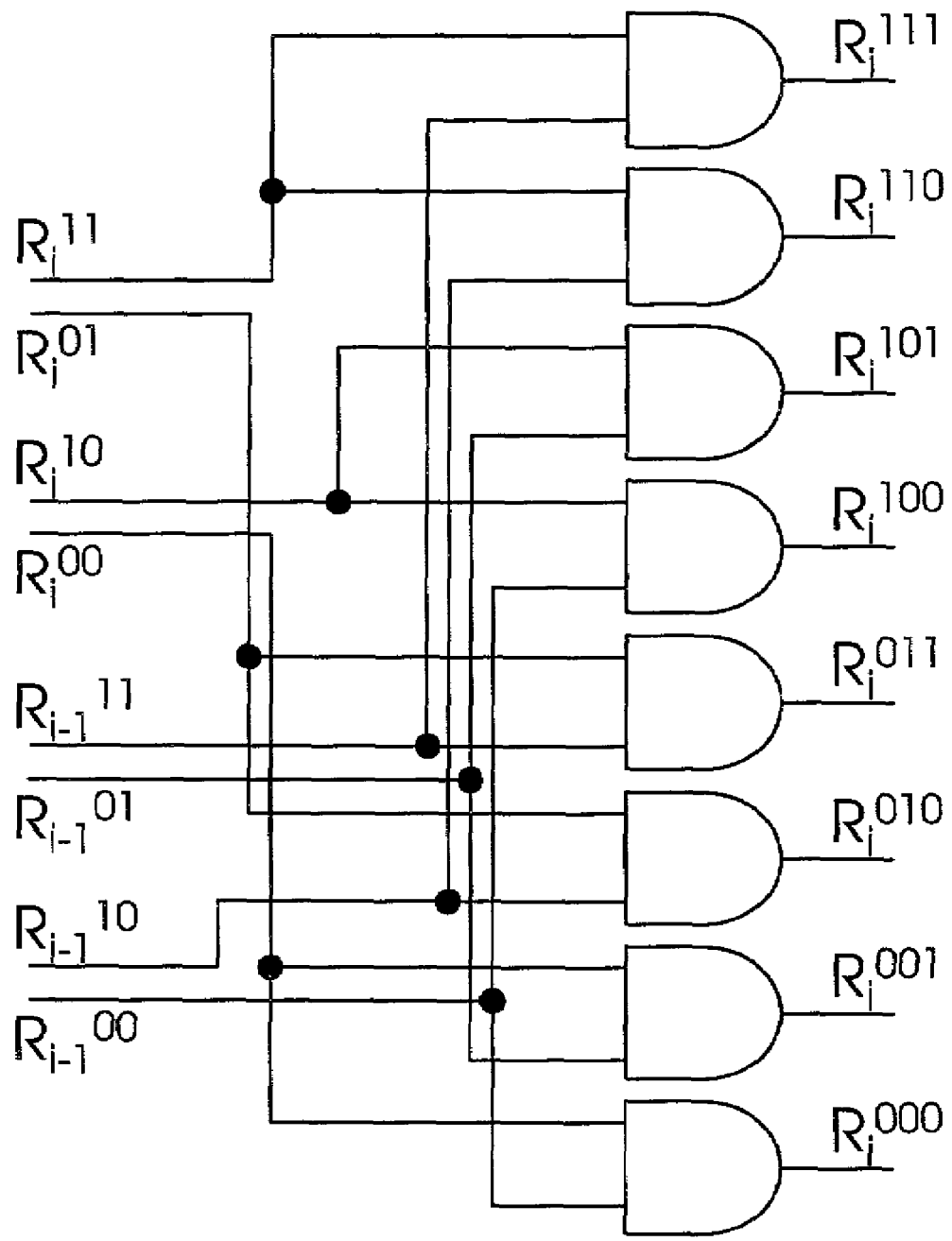
FIG. 8 shows one embodiment of a decoder component circuit that combines two-bit subsequences into three-bit subsequences.

The possible three-bit subsequences ending at position, i, can be identified by combining possible two-bit sequences ending at position, i, with the possible two-bit subsequences ending at position, i−1. FIG. 8 shows one embodiment of a decoder component circuit that combines two-bit subsequences into three-bit subsequences in this manner. It should be noted, of course, that one skilled in the art could modify the pre-decoders illustrated in FIGS. 6 and 7 to directly identify possible three-bit subsequences, or to identify possible four-bit subsequences, or to identify possible subsequences of any other size.

As shown in FIG. 8, a 3-bit possible subsequence indicator for a subsequence with most significant bit at position, i, in a wordline sequence is activated according to the following logic equations or their equivalents:

$R_i^{111} = R_i^{11}$ AND $R_{i-1}^{11}$, $R_i^{110} = R_i^{11}$ AND $R_{i-1}^{10}$, $R_i^{101} = R_i^{10}$ AND $R_{i-1}^{01}$, $R_i^{100} = R_i^{10}$ AND $R_{i-1}^{00}$, $R_i^{011} = R_i^{01}$ AND $R_{i-1}^{11}$, $R_i^{010} = R_i^{01}$ AND $R_{i-1}^{10}$, $R_i^{001} = R_i^{00}$ AND $R_{i-1}^{01}$, and $R_i^{000} = R_i^{00}$ AND $R_{i-1}^{00}$, In a like manner, longer subsequences could be identified by ANDing together additional subsequences.

Figure 9:
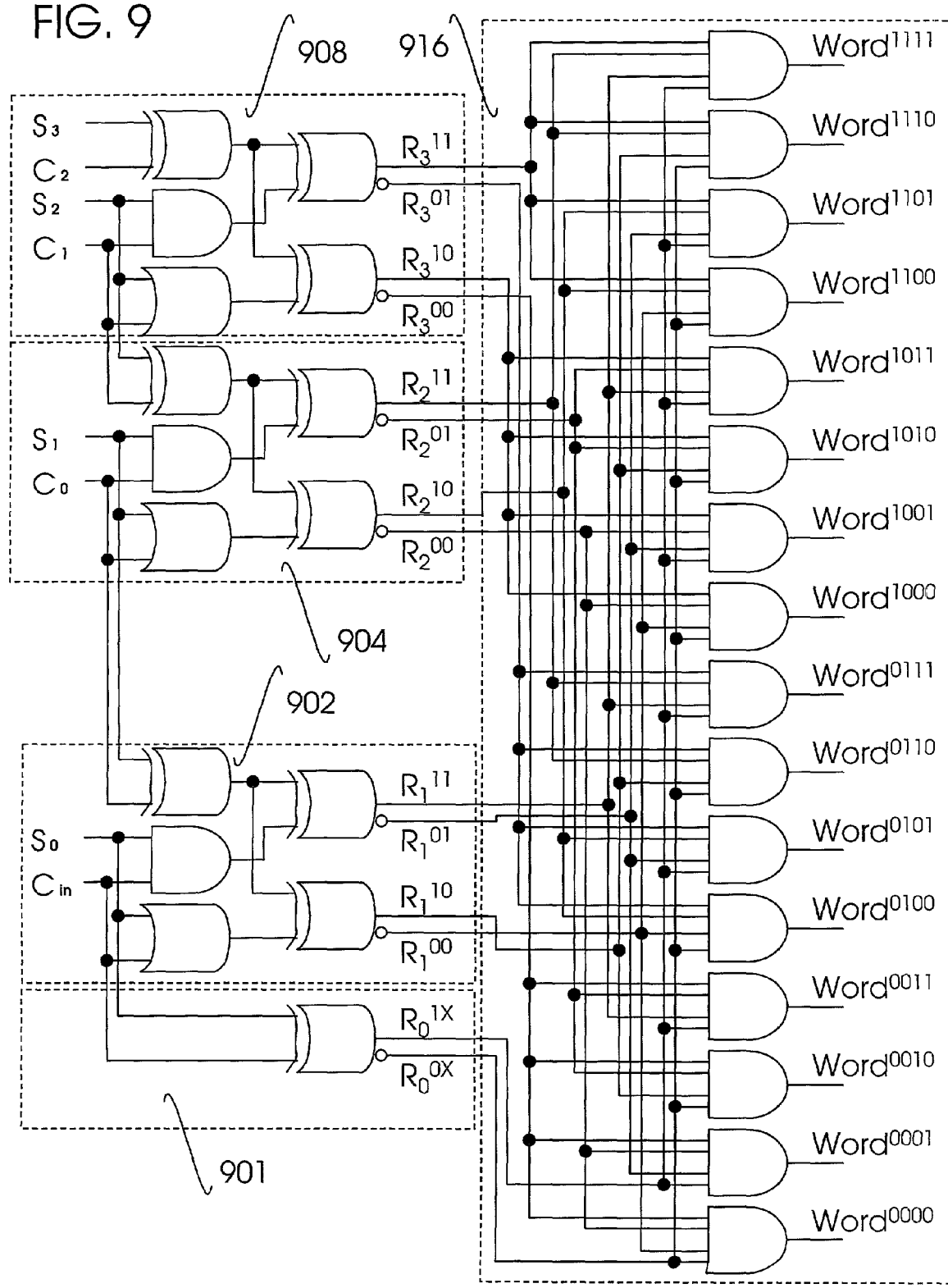
FIG. 9 details one embodiment of a cache wordline decoder for decoding four-digit addresses in a carry-sum redundant form.

One embodiment of a cache wordline decoder for decoding four-digit binary addresses in a carry-sum redundant form is illustrated in FIG. 9. Through combining the possible two-bit subsequences ending at position, i, identified by pre-decoder component circuit 908; position i−1, identified by pre-decoder component circuit 904; and position i−2, identified by pre-decoder component circuit 902; position with the one-bit possibilities for the least significant position, identified by pre-decoder component circuit 901 the unique four-bit wordline corresponding to the carry-sum redundant address can be identified without requiring carry propagation.

A unique wordline indicator for a 4-bit wordline sequence is activated by decoder 916 according to the following logic equations or their equivalents:

Word$^{1111}$=$R_3^{11}$ AND $R_2^{11}$ AND $R_1^{11}$ AND $R_0^{1X}$,

Word$^{1110}$=$R_3^{11}$ AND $R_2^{11}$ AND $R_1^{10}$ AND $R_0^{0X}$,

Word$^{1101}$=$R_3^{11}$ AND $R_2^{10}$ AND $R_1^{01}$ AND $R_0^{1X}$,

Word$^{1100}$=$R_3^{11}$ AND $R_2^{10}$ AND $R_1^{00}$ AND $R_0^{0X}$,

Word$^{1011}$=$R_3^{10}$ AND $R_2^{01}$ AND $R_1^{11}$ AND $R_0^{1X}$,

Word$^{1010}$=$R_3^{10}$ AND $R_2^{01}$ AND $R_1^{10}$ AND $R_0^{0X}$,

Word$^{1001}$=$R_3^{10}$ AND $R_2^{00}$ AND $R_1^{01}$ AND $R_0^{1X}$,

Word$^{1000}$=$R_3^{10}$ AND $R_2^{00}$ AND $R_1^{00}$ AND $R_0^{0X}$,

Word$^{0111}$=$R_3^{01}$ AND $R_2^{11}$ AND $R_1^{11}$ AND $R_0^{1X}$,

Word$^{0110}$=$R_3^{01}$ AND $R_2^{11}$ AND $R_1^{10}$ AND $R_0^{0X}$,

Word$^{0101}$=$R_3^{01}$ AND $R_2^{10}$ AND $R_1^{01}$ AND $R_0^{1X}$,

Word$^{0100}$=$R_3^{01}$ AND $R_2^{10}$ AND $R_1^{00}$ AND $R_0^{0X}$,

Word$^{0011}$=$R_3^{00}$ AND $R_2^{01}$ AND $R_1^{11}$ AND $R_0^{1X}$,

Word$^{0010}$=$R_3^{00}$ AND $R_2^{01}$ AND $R_1^{AND\ R_0^{0X}}$,

Word$^{0001}$=$R_3^{00}$ AND $R_2^{00}$ AND $R_1^{01}$ AND $R_0^{1X}$, and

Word$^{0000}$=$R_3^{00}$ AND $R_2^{00}$ AND $R_1^{00}$ AND $R_0^{0X}$.

Figure 10A:
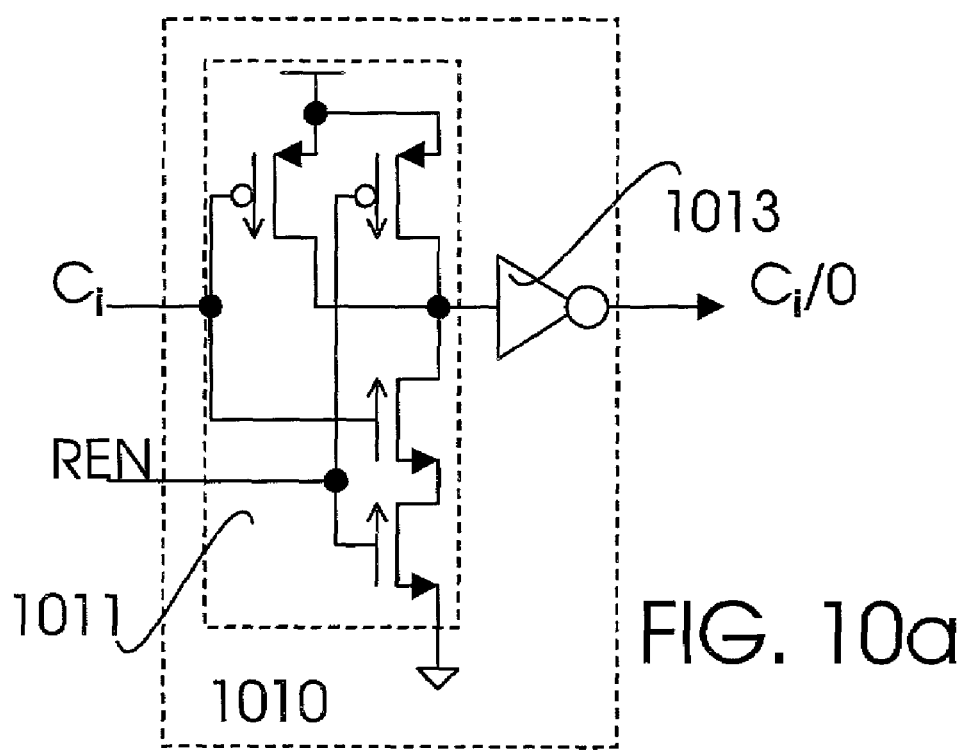
FIG. 10a shows one embodiment of a circuit for selectively replacing one redundant representation bit with a constant bit for addresses in a redundant form.

In FIG. 10a, one embodiment of a circuit for selectively replacing 1010 one bit of a bit vector of an address in redundant form with a constant bit is illustrated. When redundant enable, REN, is asserted, a signal $C_i$ will propagate through the NAND structure 1011 and the inverter 1013 to produce $C_i$ at the output. When REN is negated, a constant low logic level will be produced.

Figure 10B:
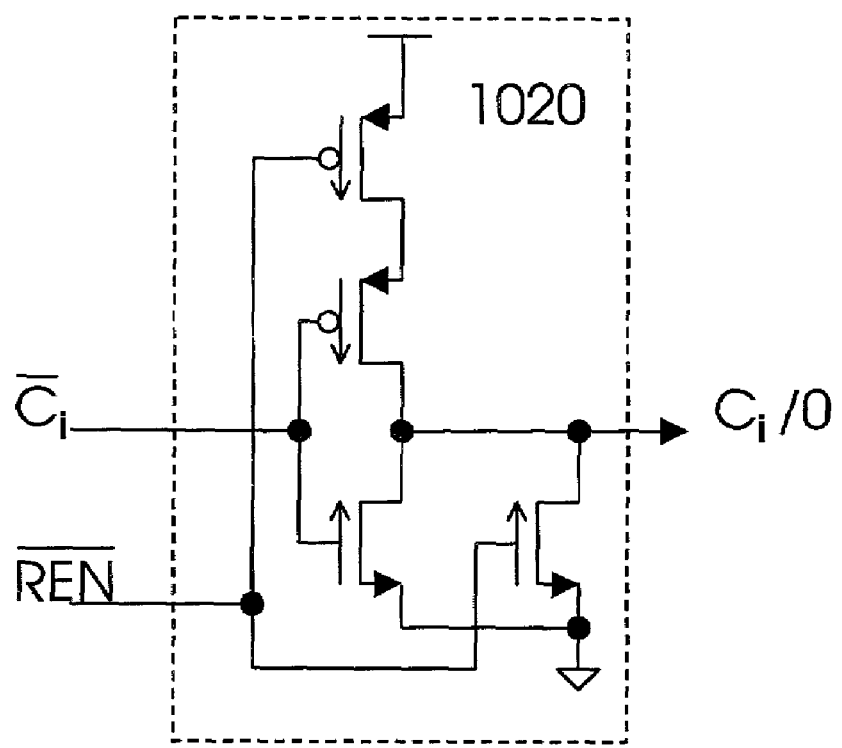
FIG. 10b shows another embodiment of a circuit for selectively replacing one redundant representation bit with a constant bit for addresses in a negated redundant form.

In FIG. 10b, another embodiment of a circuit for selectively replacing one bit of an address in negated redundant form with a constant bit is illustrated. When low active redundant enable, REN bar, is asserted, an input signal, not $C_i$, will propagate through the NOR structure 1020 to produce $C_i$ at the output. When REN bar is high, a constant low logic level will be produced.

Figure 11:
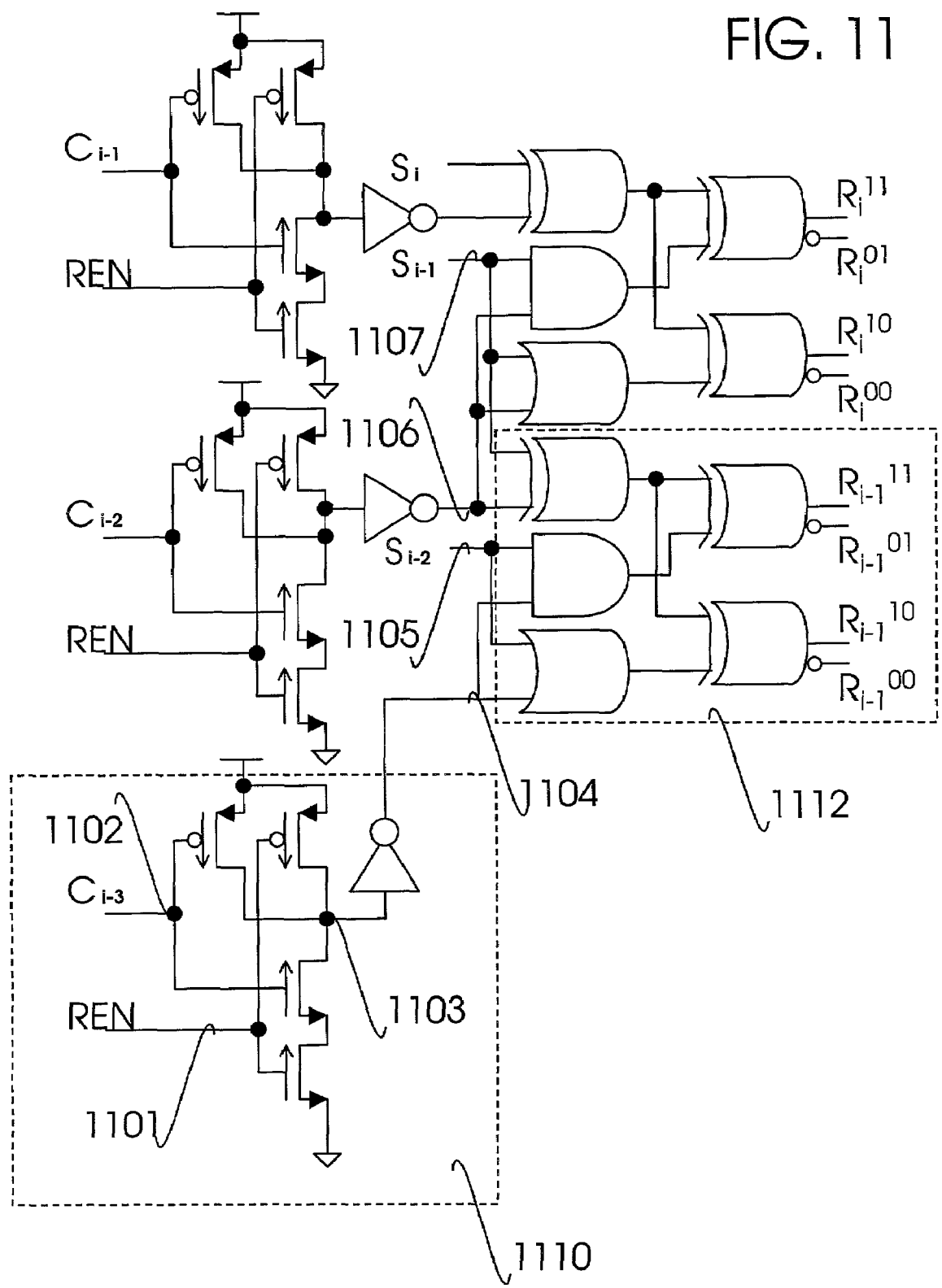
FIG. 11 shows another embodiment of a pre-decoder component circuit that accepts addresses in a carry-sum redundant form and provides selective replacement of one redundant representation bit vector with a constant bit vector.

The circuit of FIG. 10a can be used in a pre-decode component circuit to replace the carry bit vector with a constant bit vector. FIG. 11 shows an embodiment of a pre-decoder component circuit that accepts an address in a carry-sum redundant form and provides selective replacement of the carry bit vector with a constant bit vector. By selecting the correct constant, an address in unsigned binary form can be accepted as the sum bit vector and the resulting cache wordline decoder can be used for either redundant addresses or unsigned binary addresses. For example, if redundant enable signal, REN, is asserted on select input 1101, then the carry signal $C_{i-3}$ on bit vector input 1102 propagates through the AND structure 1110 undergoing two inversions to input 1104 of the pre-decode component circuit 1112 where it is combined with $S_{i-2}$ on bit vector input 1105, $S_{i-1}$ on bit vector input 1107, and similarly processed $C_{i-2}$ at the bit vector replacement output 1606. On the other hand, if redundant enable signal, REN, is low on select input 1101, then the carry signal $C_{i-3}$ on bit vector input 1102 does not propagate through the AND structure 1110, but rather the low value of REN propagates a zero to input 1104 of the pre-decode component circuit 1112 where it is combined with $S_{i-2}$ on bit vector input 1105, $S_{i-1}$ on bit vector input 1107, and a similarly produced zero at the bit vector replacement output 1606.

Figure 12:
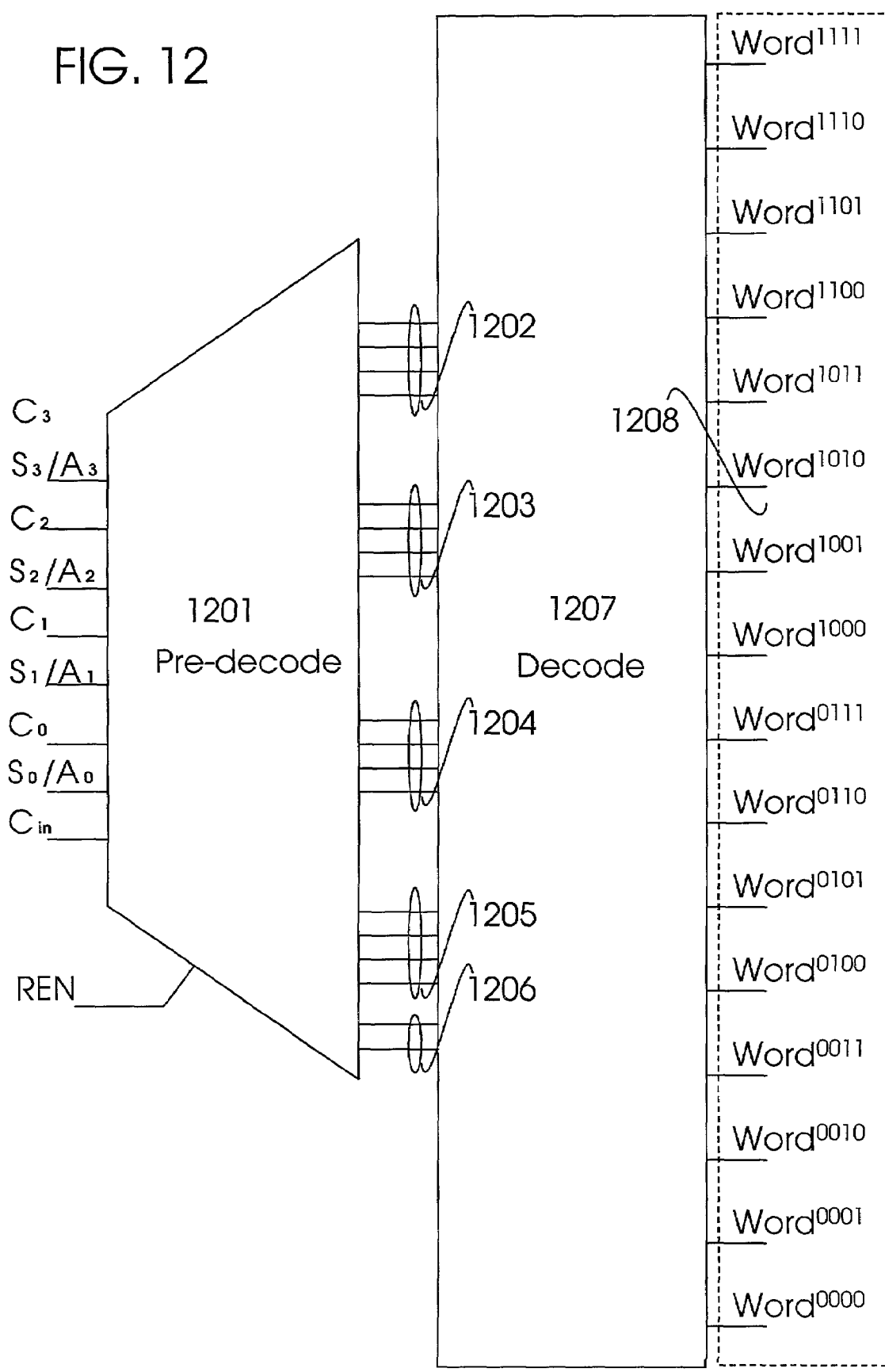
FIG. 12 shows one embodiment of a cache wordline decoder for carry-sum redundant load addresses and unsigned binary store addresses that provides selective replacement of one redundant representation bit vector with a constant bit vector.

One embodiment of a cache wordline decoder for carry-sum redundant load addresses represented by a sum bit vector, S, and a carry bit vector, C, or unsigned binary store addresses represented by the linear bit vector, A, is depicted in FIG. 12. Pre-decode circuitry 1201 provides selective replacement of the carry bit vector with a constant bit vector, responsive to negation of a redundant enable control signal, REN. The decoding is then allowed to proceed as usual. In order to identify a corresponding wordline, Wordline$^i$, in cache memory, adjacent digits can first be pre-decoded by pre-decoder 1201 to identify possible subsequences that could result from completion of carry propagation. According to the identified possible subsequences, subsequence indicators in subsequence indicator sets 1202, 1203, 1204, and 1205, 1206 are activated. These subsequence indicators are combined in decoder 1207 to identify a unique wordline sequence. According to the wordline sequence identified, one of a set of wordline indicators 1208 is activated to access a corresponding location in cache.

Figure 13A:
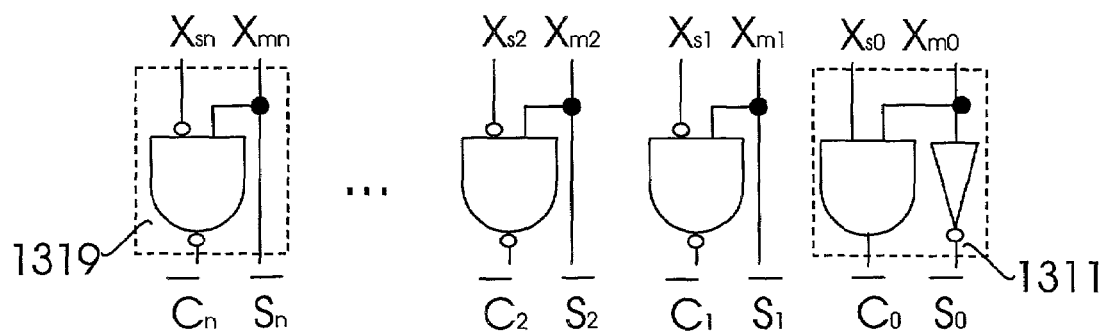
FIG. 13a shows one embodiment of circuit that accepts addresses in a sign-digit redundant form and provides addresses in a negated carry-sum redundant form.

Another redundant representation used to quickly calculate load addresses without carry propagation is the sign-digit redundant form. In the sign-digit redundant form, each digit is represented by sign bit, $X_{si}$, and a magnitude bit, $X_{mi}$. FIG. 13a shows one embodiment of circuit that accepts addresses in a sign-digit redundant form and produces addresses in a negated carry-sum redundant form. A least significant digit 1311 is produced by negating $X_{m0}$ to produce a negated sum bit, $S_0$ bar, while $X_{S0}$ and $X_{m0}$ are combined through an AND gate to produce $C_0$ bar. Other digits, including a most significant digit 1319 are produced by propagating each $X_{mi}$ to produce each negated sum bit, $S_i$ bar, while NOT $X_{si}$ and $X_{mi}$ are combined through a NAND gate to produce $C_i$ bar.

Figure 13B:
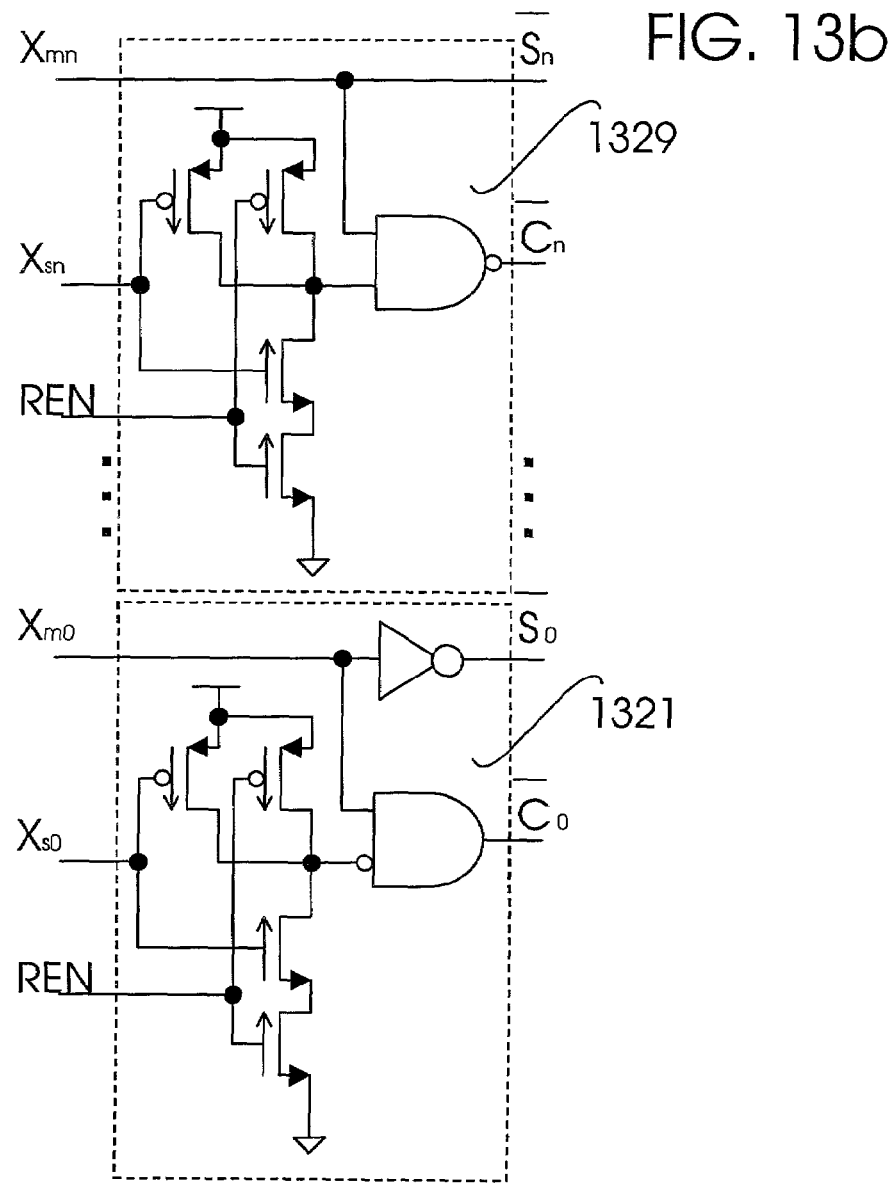
FIG. 13b shows of circuit that accepts addresses in a sign-digit redundant form, provides selective replacement of one redundant representation bit vector with a constant bit vector and provides addresses in a negated carry-sum redundant form.

FIG. 13b shows another embodiment of a bit vector selection or bit vector replacement circuit including, a least significant digit replacement circuit 1321 and a most significant replacement circuit 1329, that accepts addresses in a sign-digit redundant form and provides selective replacement of the sign bit vector with a constant bit vector producing addresses in a negated carry-sum redundant form. Combining this circuit with the pre-decode component circuit depicted in FIG. 7 produces the embodiment illustrated in FIG. 14.

Figure 14:
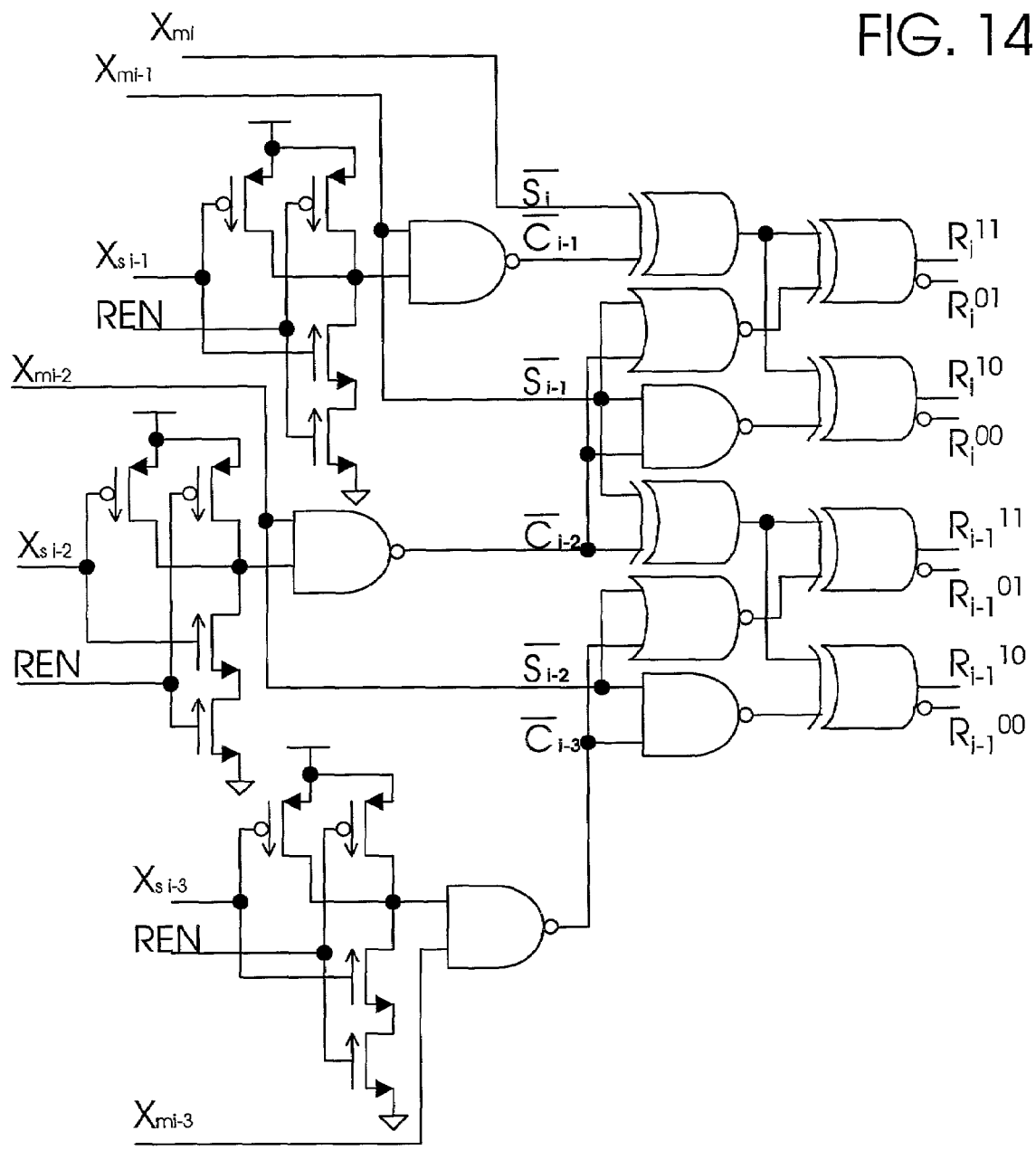
FIG. 14 shows another embodiment of a pre-decoder component circuit that accepts addresses in a sign-digit redundant form and provides selective replacement of one redundant representation bit vector with a constant bit vector.

In FIG. 14, a pre-decoder component circuit that accepts addresses in a sign-digit redundant form provides selective replacement of the sign bit vector with a constant bit vector. By selecting the correct constant, an address in unsigned binary form can be accepted as the magnitude bit vector and the resulting cache wordline decoder can be used for either redundant addresses or unsigned binary addresses.

Figure 15:
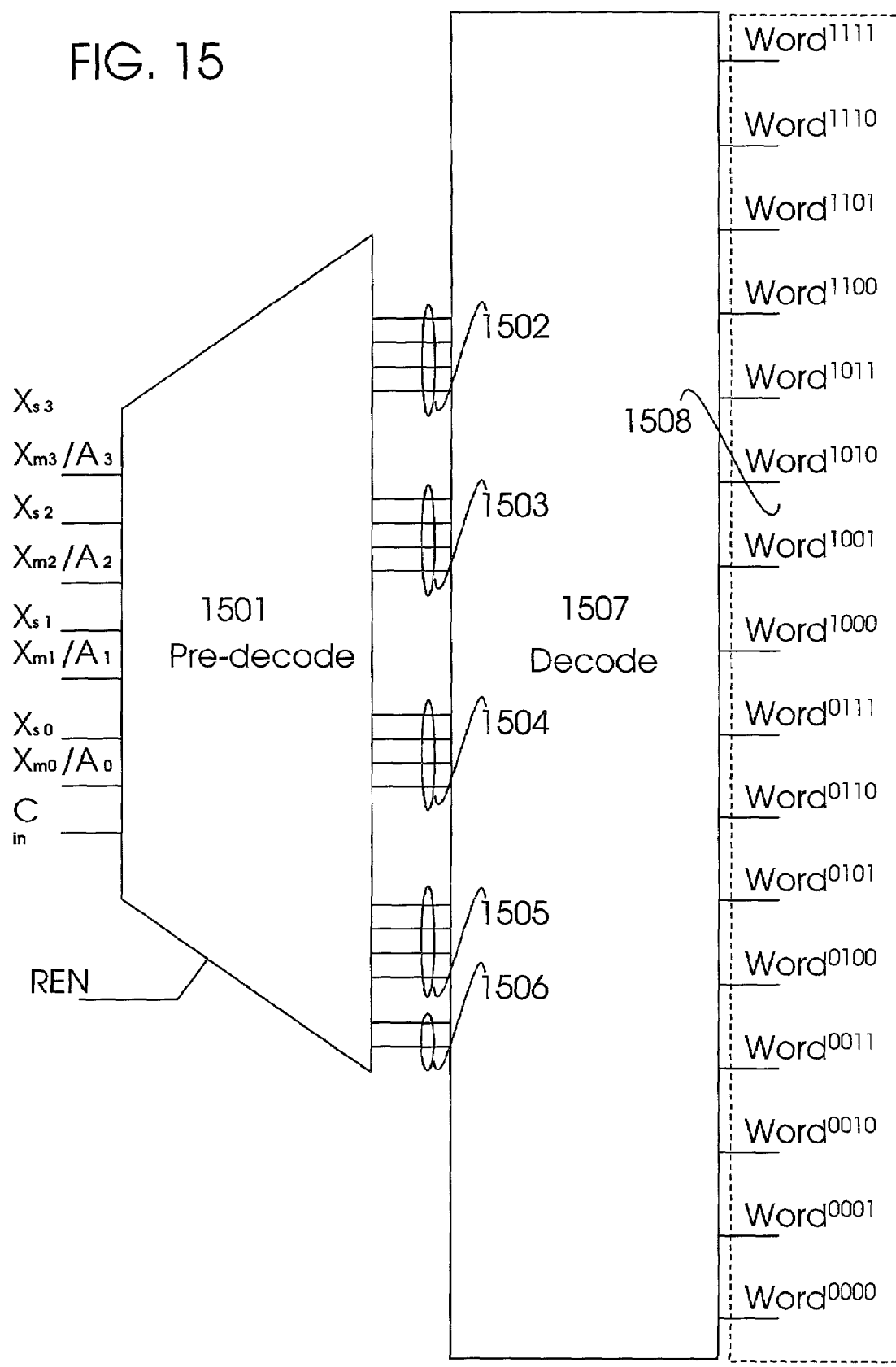
FIG. 15 shows another embodiment of a cache wordline decoder for sign-digit redundant load addresses and unsigned binary store addresses that provides selective replacement of one redundant representation bit vector with a constant bit vector.

One embodiment of a cache wordline decoder for sign-digit redundant load addresses represented by a sign bit vector, $X_s$, and a magnitude bit vector, $X_m$, or unsigned binary store addresses represented by the linear bit vector, A, is depicted in FIG. 15. Pre-decode circuitry 1501 provides selective replacement of the sign bit vector with a constant bit vector, responsive to negation of a redundant enable control signal, REN. The decoding is again allowed to proceed as usual. In order to identify a corresponding wordline, $Wordline^i$, in cache memory, adjacent digits can first be pre-decoded by pre-decoder 1501 to identify possible subsequences that could result from completion of carry propagation. According to the identified possible subsequences, subsequence indicators in subsequence indicator sets 1502, 1503, 1504, and 1505, 1506 are activated. These subsequence indicators are combined in decoder 1507 to identify a unique wordline sequence. According to the wordline sequence identified, one of a set of wordline indicators 1508 is activated to access a corresponding location in cache.

Figure 16:
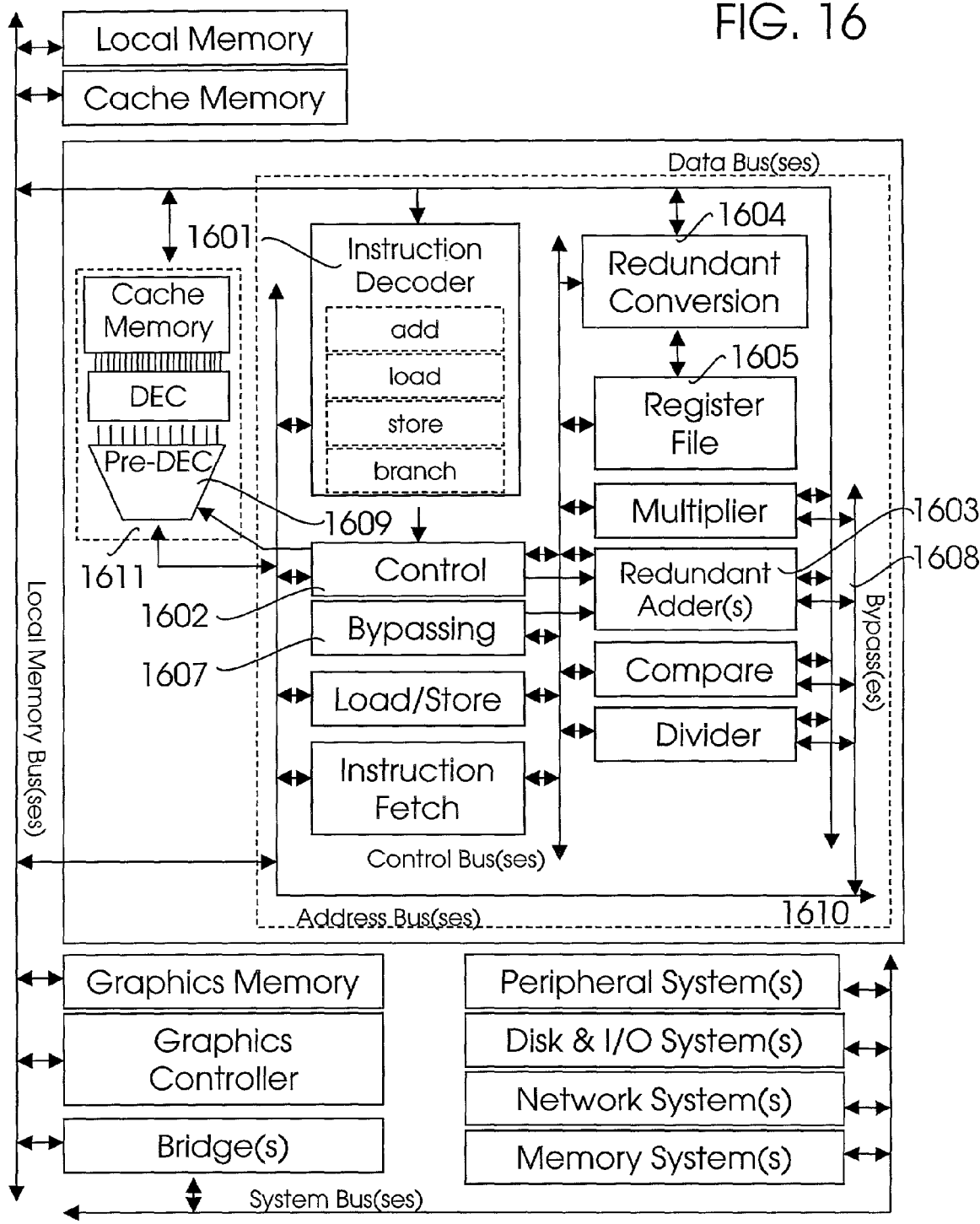
FIG. 16 shows one embodiment of a digital computing system comprising a cache wordline decoder for redundant load addresses and unsigned binary store addresses that provides selective replacement of one redundant representation bit vector with a constant bit vector.

One embodiment of a digital computing system is shown in FIG. 16, which comprises a cache wordline decoder, 1611, for receiving redundant load addresses and unsigned binary store addresses. In one embodiment, cache 1611, is the fastest cache in a hierarchical plurality of caches including slower external caches and 1611 is resident on the same die as processor, 1610. In another embodiment, cache 1611 and possibly other internal caches reside on the same die, but there are no external caches.

Instruction decoder, 1601, receives instructions that may include additions, loads, stores, etc. For example, an first instruction to add a base address in a first register to an index in a second register, writing the result in a third register may be received and decoded. Then a second instruction to load data from the address in the third register may be received and decoded. The first instruction may produce a result by providing operands from a register file, 1605, to a redundant adder, 1603. In order to complete the second instruction quickly, the result produced by redundant adder, 1603, may be bypassed to a cache, 1611, by the bypassing control 1607. Control unit, 1602, asserts redundant enable (REN) to direct pre-decoder, 1609, to handle the address in redundant form.

On the other hand, a third instruction to store a new result back to the address location found in the third register may be received. In this case the result produced by redundant adder, 1603, in the first instruction may have already been converted to unsigned binary form by redundant conversion unit, 1604, and written into register file, 1605. Therefore the contents of the third register are sent to the cache, 1611, and control unit, 1602, negates REN to direct the pre-decoder, 1609, to provide selective replacement of one redundant representation bit vector with a constant bit vector, thereby correctly decoding the unsigned binary address received.

Figure 17:
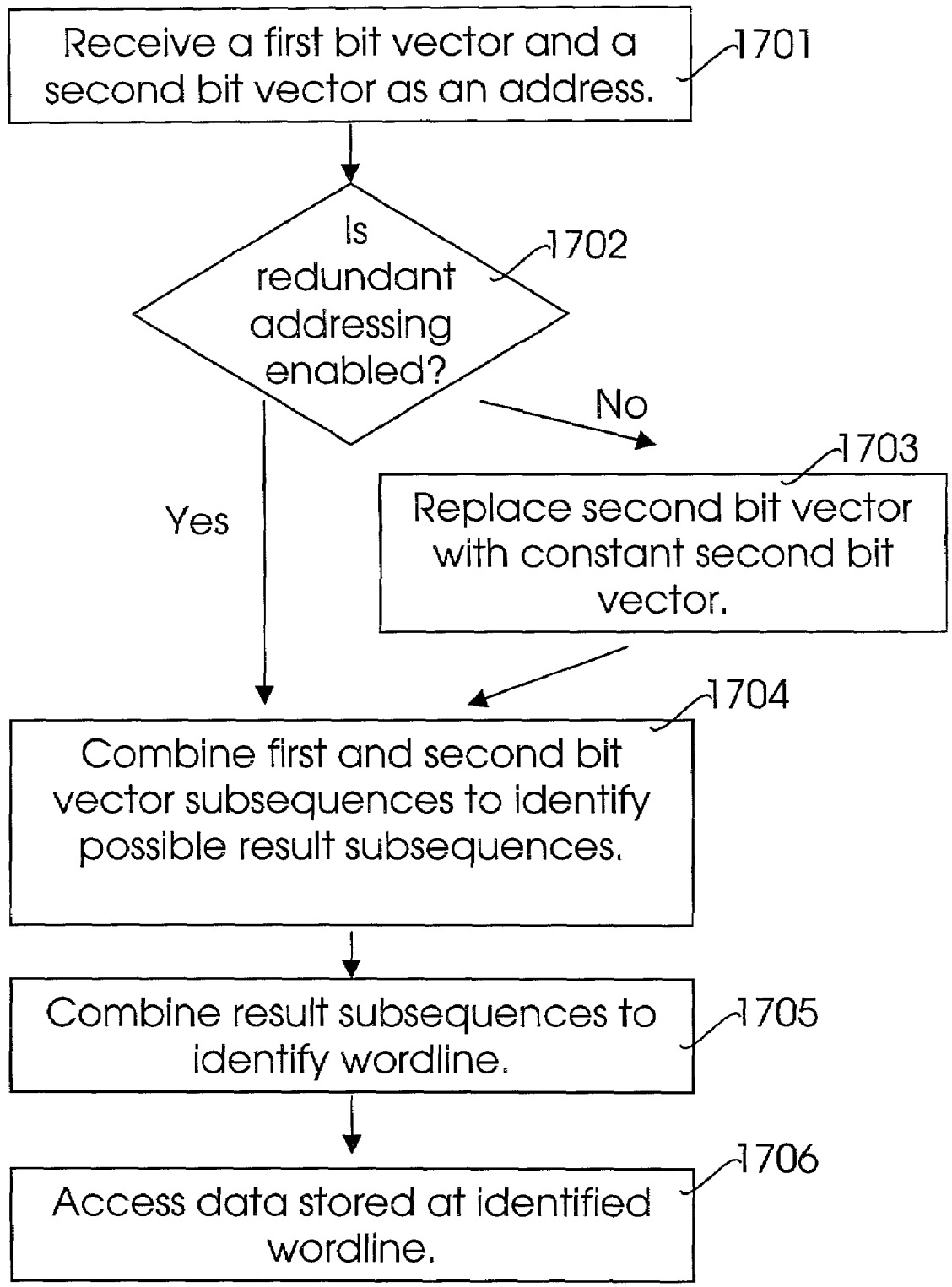
FIG. 17 shows one embodiment of a method of cache wordline decoding for redundant addresses or unsigned binary addresses using selective replacement of one redundant representation bit vector with a constant bit vector.

In FIG. 17 one embodiment of a method of wordline decoding for redundant addresses or unsigned binary addresses in a cache is illustrated. After receiving an address comprising a first bit vector and a second bit vector, 1701, at the cache, a check is performed to determine if redundant addressing is enabled, 1702. If it is enabled, subsequences of the first bit vector are combined, 1704, with subsequences of the second bit vector to identify possible result subsequences. The result subsequences are then combined, 1705, to identify the unique wordline represented by the redundant address, and data stored at the identified wordline is accessed, 1706.

On the other hand, if redundant addressing is not enabled, 1702, then a selective replacement, 1703, of one redundant representation bit vector with a constant bit vector is performed. Subsequences of the original bit vector and the replaced bit vector are then combined, 1704, as before to identify possible result subsequences. Finally, these result subsequences are then combined, 1705, to identify the unique wordline represented by the redundant address, and data stored at the identified wordline is accessed, 1706.

The above description is intended to illustrate preferred embodiments of the present invention. From the discussion above it should also be apparent that the invention can be modified in arrangement and detail by those skilled in the art without departing from the principles of the present invention within the scope of the accompanying claims.

What is claimed is:

1. An apparatus for accessing data in a memory, the apparatus comprising:

a bit vector replacement circuit to receive a first bit vector and a control signal and to substitute a constant bit vector for the first bit vector, in response to the control signal being in a first state, to produce a second bit vector;

a pre-decoder coupled with the bit vector replacement circuit to receive a plurality of bit vectors including the second bit vector, to combine subsequences from the plurality of bit vectors to identify possible wordline subsequences corresponding to the plurality of bit vectors, and to activate a subsequence indicator for an identified possible wordline subsequence; and a wordline decoder coupled with the pre-decoder to combine activated subsequence indicators to identify a unique wordline corresponding to the plurality of bit vectors.

2. The apparatus of claim 1, wherein the plurality of bit vectors correspond to an address represented in carry-sum redundant form.

3. The apparatus of claim 1, wherein the plurality of bit vectors comprise:
a carry bit vector including a carry bit corresponding to a binary digit of the address; and
a sum bit vector including a sum bit corresponding to a binary digit of the address.

4. The apparatus of claim 3, wherein the first bit vector is the carry bit vector.

5. The apparatus of claim 4, wherein the second bit vector produced by the bit vector replacement circuit in response to the control signal being in a second state corresponds to the carry bit vector.

6. The apparatus of claim 1, wherein the plurality of bit vectors correspond to an address represented in sign-digit redundant form.

7. The apparatus of claim 6, wherein the plural of bit vectors comprise:
a sign bit vector including a sign bit corresponding to a binary digit of the address; and
a magnitude bit vector including a magnitude bit corresponding to a binary digit of the address.

8. The apparatus of claim 7, wherein the first bit vector is the sign bit vector.

9. The apparatus of claim 8, wherein the second bit vector produced by the bit vector replacement circuit in response to the control signal being in a second state corresponds to the sign bit vector.

10. The apparatus of claim 1, wherein the vector replacement circuit substitutes a constant bit vector corresponding to a zero vector for the first bit vector.

11. The apparatus of claim 1, wherein the pre-decoder is a carry nonpropagative circuit.

12. The apparatus of claim 11, wherein the pre-decoder identifies possible two-bit wordline subsequences.

13. The apparatus of claim 11, wherein the pre-decoder activates a subsequence indicator for an identified possible two-bit subsequence.

14. The apparatus of claim 1, wherein one of the plurality of bit vectors corresponds to an address represented in unsigned binary form.

15. The apparatus of claim 14, wherein said one of the plurality of bit vectors corresponds to a store address.

16. The apparatus of claim 1, further comprising:
a cache coupled with the wordline decoder to store a copy of a datum stored in the memory, the copy being stored at a wordline in the cache corresponding to an address in the memory.

17. The apparatus of claim 16, further comprising:
a processor coupled with the pre-decoder to produce the plurality of bit vectors.

18. The apparatus of claim 17, wherein the processor produces one or more of the plurality of bit vectors by adding together addressing components including a base address and an index or a displacement.

19. A digital computing system comprising:
a die;
a bit vector selection circuit on the die to receive a first bit vector and a control signal, and to select a constant bit vector or the first bit vector responsive to the control signal, and to output the selected bit vector as a second bit vector;
a decoder circuit on the die coupled to the bit vector selection circuit to receive a plurality of bit vectors including the second bit vector and to combine a subsequence from each of the plurality of bit vectors to identify a wordline corresponding to the plurality of bit vectors;
an internal cache on the die, the internal cache coupled with the decoder circuit to store a first datum at the wordline corresponding to the plurality of bit vectors;
a processor on the die coupled with the decoder circuit to produce the plurality of bit vectors; and
an external cache, not on the die, to store a second datum, the external cache coupled with the die and with the internal cache, to transmit the second datum to the internal cache to be stored on the die.

20. The digital computing system of claim 19, wherein the plurality of bit vectors correspond to an address represented in carry-sum redundant form and the plurality of bit vectors comprise:
a carry bit vector including a carry bit corresponding to a binary digit of the address; and
a sum bit vector including a sum bit corresponding to a binary digit of the address.

21. The digital computing system of claim 20, wherein the first bit vector is the carry bit vector.

22. The digital computing system of claim 19, wherein one of the plurality of bit vectors corresponds to an address represented in unsigned by form.

23. The apparatus of claim 22, wherein said one of the plurality of bit vectors corresponds to a store address.

24. A cache memory system comprising:
a plurality of lines for storing copies of memory storage locations having corresponding addresses;
means for decoding an address to access a line of the cache memory system responsive to an access request that includes an address represented in a redundant form; and
means for decoding an address to access a line of the cache memory system responsive to an access request that includes an address represented in unsigned binary form.

25. The cache memory system of claim 24, wherein the address represented in a redundant form comprises a first bit vector that is a sign bit vector.

26. The cache memory system of claim 25, wherein decoding an address to access a line of the cache memory system responsive to the access request comprises producing a second bit vector corresponding to the sign bit vector.

27. The cache memory system of claim 24 further comprising a pre-decoder that is a carry nonpropagative circuit.

28. The cache memory system of claim 27, wherein the pre-decoder identifies possible two-bit wordline subsequences.

29. The The cache memory system of claim 27, wherein the pre-decoder activates a subsequence indicator for an identified possible two-bit subsequence.

30. A method of accessing data in a first storage, the method comprising:
copying a plurality of storage locations from a second storage into a plurality of wordlines of the first storage by asserting corresponding wordline signals;
receiving an access request including a first bit vector, a second bit vector and a control signal;
setting the second bit vector equal to a constant bit vector if the control signal is in a first state;
identifying at least in part from the second bit vector and from the first bit vector a word line corresponding to the combined first bit vector and second bit vector;
asserting the identified wordline signal; and accessing the wordline of the first storage corresponding to the assertedword line signal.

31. The method of claim 30, wherein the second bit vector is a carry bit vector.

32. The method of claim 31, wherein said one of the plurality of bit vectors corresponds to a store address.

33. The method of claim 30, wherein the first bit vector corresponds to an address represented in unsigned binary form.

* * * * *